March 3, 1964  R. N. GHOSE  3,123,767
APPARATUS FOR DETERMINING THE CONDUCTIVITY AND DIELECTRIC
CONSTANT OF THE EARTH ALONG ITS SURFACE
Filed Jan. 5, 1960
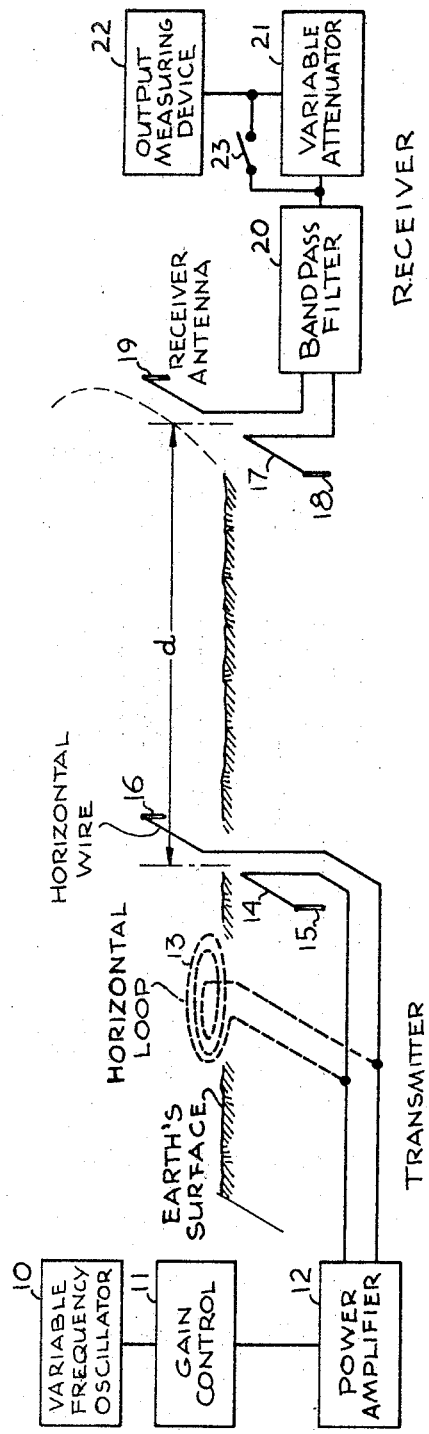
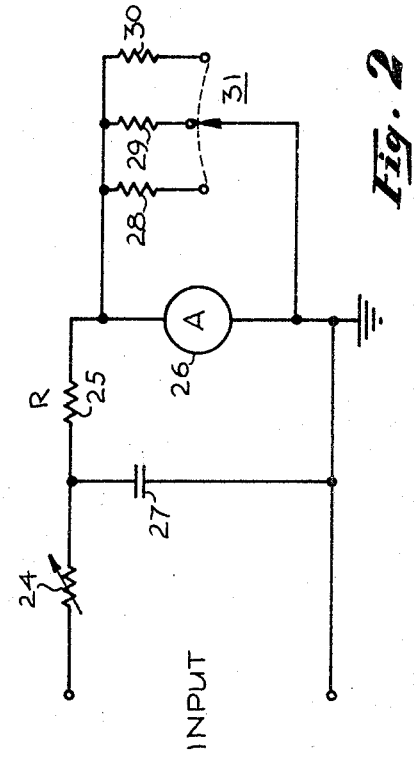
RABINDRA N. GHOSE
INVENTOR.
BY Allen E. Botney
ATTORNEY

3,123,767
APPARATUS FOR DETERMINING THE CONDUCTIVITY AND DIELECTRIC CONSTANT OF THE EARTH ALONG ITS SURFACE
Rabindra N. Ghose, Los Angeles, Calif., assignor, by mesne assignments, to Space-General Corporation, Glendale, Calif., a corporation of California
Filed Jan. 5, 1960, Ser. No. 600
1 Claim. (Cl. 324—6)

The present invention relates in general to the art of geophysical exploration and more particularly relates to a method and apparatus for measuring electromagnetic characteristics of the earth.

In an article entitled "Calculation of the Ground Wave Field Intensity" that appeared in Proceedings of the I.R.E., volume 29, December 1941 issue, pages 623–643, K. A. Norton, the article's author, shows that for a given transmitter antenna current, the electric field radiated from the transmitter antenna depends on the effective conductivity of the intervening path. In another article written by J. R. Wait and W. A. Pope entitled "Input Resistances of l.f. Unipole Aerials," Wireless Engineering, volume 32, May 1955 issue, pages 131–138, it is shown that the input resistance and, consequently, the efficiency of a VLF transmitting antenna is a function of the properties of the neighboring land. It is thus seen by these few examples that knowledge of the electrical characteristics of the ground, such as conductivity and dielectric constant, is oftentimes essential in the design of some communication systems, such as VLF radio links. The present invention involves a new technique and apparatus embodying this technique for measuring these referred-to electrical characteristics of the earth and, therefore, while not limited thereto, is useful for the design of VLF communication systems.

Devices for measuring ground conductivity are known and available but they have not been entirely satisfactory in providing the data necessary for the proper design of VLF communication systems. More particularly, the so-called "Wenner array" has ben used for the past several years to measure the direct-current resistivity and, therefore, the direct-current conductivity of the ground. However, the conductivity of the earth may be expected to be quite different at higher frequencies, that is, at the frequencies of several kilocycles, with the result that the readings of D.C. conductivity may result in faulty system design. Another arrangement, known as the "Eltern array," has also been used to measure the conductivity of the ground at the D.C. frequency with the same disadvantages resulting therefrom. In essence, these arrays assume a type of field distribution and use what may be termed the impedance characteristics rather than the propagation characteristics of the ground when the ground is used as a communication medium.

Another distinct disadvantage of the earlier devices used for measuring ground conductivity is that they offer no opportunity for measuring other of the earth's properties, such as the dielectric constant. Consequently, it has been necessary to employ additional apparatus whenever information relative to the dielectric constant was needed. This is obviously more expensive and time consuming than using a single device to provide both values.

It is, therefore, an object of the present invention to provide a method and apparatus that makes use of the propagation characteristics of the earth for measuring the properties of the earth along its surface.

It is another object of the present invention to provide a method and apparatus for accurately measuring some of the earth's electrical properties at frequencies above D.C.

It is a further object of the present invention to provide a method and apparatus for measuring more than one of the earth's electrical properties.

It is an additional object of the present invention to provide a single method and apparatus for determining both the conductivity and the dielectric constant of the earth along its surface.

The present invention eliminates and avoids the mentioned limitations and disadvantages, as well as others, encountered with the use of prior art devices for measuring the characteristics of the earth and, in accordance with the basic concept of the present invention, this is done by obtaining electromagnetic field measurements at two different frequencies, one slightly above and the other slightly below the frequency of interest. By forming a ratio of the measurements thusly made, values for conductivity and dielectric constant are readily obtained.

More particularly, one embodiment for making such measurements comprises transmitter apparatus and an antenna which may be either an electrically shorted horizontal dipole or a loop placed at the surface of the earth. In the case of the horizontal dipole, vertical stakes or electrodes are connected to the ends of the dipole and driven into the ground for matching purposes. These antennas will generate Zenneck type surface waves and the electromagnetic field at the surface of the earth resulting from them will be a function of the average ground parameters between the transmitter and receiver sites. More specifically, using a horizontal dipole as a transmitter antenna, the received field at a distance "$d$" from the dipole, where "$d$" is less than one sixth of the free space wavelength of the signal being generated, is given by the equation $$|E_\phi|_{MAX.} \simeq \frac{IL_T}{2\pi\sigma d^3 \sqrt{1+\frac{\omega^2\epsilon^2}{\sigma^2}}}$$

where $I$ = Transmitter antenna current
$L_T$ = Transmitter antenna length
$\sigma$ = Ground conductivity
$\epsilon$ = Ground dielectric constant
$|E_\phi|_{max}$ = Maximum "broadside" electric field at a distance "$d$" from the transmitter antenna, and
$\omega$ = Angular frequency of the transmitter.

By setting up electromagnetic fields at two different frequencies, one immediately above and the other immediately below the frequency of interest, two readings of voltage may be obtained at the receiver site and these readings, it will more fully be seen later, may be used in conjunction with the above equation to provide a ratio from which the conductivity and the dielectric constant of the earth between the transmitter and receiver sites may be obtained.

The values of $\sigma$ and $\epsilon$ over an entire area may be obtained by succesively positioning the receiver antenna at points along the circumference of a circle having the distance "$d$" as a radius and following the method of the present invention in each antenna position.

From what has been said, it will be recognized by those skilled in the art that the method and apparatus of the present invention makes it possible to quickly and easily obtain those parameters of the earth, namely, the conductivity and dielectric constant, that are so important in the design of VLF communication systems. Moreover, by means of this method and apparatus, accurate values of conductivity and dielectric constant are obtained in that the propagational characteristics of the earth are utilized for obtaining these values rather than its impedance characteristics. It will also be recognized that the present invention may also be used with good advantage to quickly, easily and accurately detect the presence of minerals, ores and water reservoirs that may be deposited near the surface of the earth. Finally, as will become clearer later, another beneficial feature of the present invention is that it makes it possible to obtain both the conductivity and the dielectric constant with a single piece of equipment, thereby saving time and expense.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

FIGURE 1 is a block diagram of transmitter and receiver apparatus for measuring properties of the earth in accordance with the present invention; and FIGURE 2 is a schematic circuit of the variable attenuator and the output measuring device shown in the embodiment of FIG. 1.

Considering now the drawings, reference is made to FIGURE 1 wherein there is shown transmitter and receiver apparatus that may be utilized to practice the present invention. As shown, the transmitter includes an audio oscillator 10 which is capable of generating a signal at either one of two frequencies $f_1$ and $f_2$, the magnitude of the signal generated by the oscillator being under the control of a gain control circuit 11 coupled to the oscillator at the output end thereof. A power amplifier 12 is connected between the gain control circuit and an antenna which may be either a horizontal loop antenna 13 placed at the earth's surface or a horizontal dipole 14 electrically shorted to the earth by means of electrodes 15 and 16 connected to the ends of the dipole antenna and vertically driven into the ground. To illustrate that either antenna may be used, loop antenna 13 is shown connected to the power amplifier by means of broken connecting lines whereas dipole 14 is shown connected to the amplifier through solid lines.

As for the receiver apparatus, it includes a receiving antenna which may be either a vertical loop antenna placed close to the earth's surface or a horizontal dipole which is also shorted to the earth by means of electrodes, the electrodes, as before, being connected to the ends of the dipole and vertically driven into the ground. Only the horizontal dipole is shown in the figure and it is designated 17. The electrodes for antenna 17 are designated 18 and 19. A suitable bandpass filter 20 for eliminating much of the incoming noise is connected between antenna 17 and a variable attenuator 21, the attenuator, in turn, being connected to an output measuring meter 22 which may be an ammeter type of instrument adapted to provide readings of voltage that will prove useful in obtaining the values of conductivity and dielectric constant. Connected across attenuator 21 is a switch 23 which may be selectively opened or closed to respectively place the attenuator in or out of the receiver, for reasons that will be understood later. Finally, it should be mentioned that the receiver antenna is positioned at a relatively close distance "d" from the transmitter antenna, that is, "d" is preferably less than one sixth of the free space wavelength of the signal generated by the transmitter.

Considering meter 22 in greater detail, reference is made to FIGURE 2 wherein the meter is shown to include a pair of resistors 24 and 25 connected in series with an ammeter 26, the series arrangement being connected between the meter input and ground. Resistor 24 is preferably variable and at its junction with resistor 25 a shunt capacitor 27 is connected to ground. Finally, a plurality of resistors 28, 29 and 30 are selectively connected across ammeter 26 by means of a multi-terminal switch that is generally designated 31, the resistors being used to provide different scales for the ammeter. Accordingly, although three shunt resistors are shown in the figure, there will actually be as many resistors as there are ammeter scales which may be less or more than three.

Before considering the operation, it is deemed worthwhile to mathematically show how the electric field equation set forth previously and repeated here for convenience may be used to ultimately obtain the conductivity and dielectric constant. Thus, $$|E_\phi|_{max.} = \frac{IL_T}{2\pi\sigma d^3 \sqrt{1+\frac{\omega^2\epsilon^2}{\sigma^2}}} \qquad (1)$$

If the length of the receiver antenna, namely antenna 17 in FIGURE 1, be $l_R$, the voltage across the receiver antenna is:

$$V_R = \frac{IL_T l_R}{2\pi\sigma d^3 \sqrt{1+\frac{\omega^2\epsilon^2}{\sigma^2}}} \qquad (2)$$

If $V_{R_1}$ and $V_{R_2}$ respectively denote the receiver voltages at frequencies $f_1$ and $f_2$ and for transmitter antenna currents $I_1$ and $I_2$, then $$V_{R_1} = \frac{I_1 L_T l_R}{2\pi\sigma d^3 \sqrt{1+\frac{\omega_1^2\epsilon^2}{\sigma^2}}} \qquad (3)$$

and $$V_{R_2} = \frac{I_2 L_T l_R}{2\pi\sigma d^3 \sqrt{1+\frac{\omega_2^2\epsilon^2}{\sigma^2}}} \qquad (4)$$

Now, letting $$P = \left(\frac{V_{R_1}}{V_{R_2}} \times \frac{I_2}{I_1}\right)^2 \qquad (5)$$

Then, by substitution of $V_{R_1}$ and $V_{R_2}$ of Equations 3 and 4 in Equation 5

$$P = \frac{1+\frac{\omega_2^2\epsilon^2}{\sigma^2}}{1+\frac{\omega_1^2\epsilon^2}{\sigma^2}} \qquad (6)$$

Subtracting 1 from both sides in Equation 6

$$P - 1 = \frac{1+\frac{\omega_2^2\epsilon^2}{\sigma^2}}{1+\frac{\omega_1^2\epsilon^2}{\sigma^2}} - 1 \qquad (7a)$$

which reduces to $$P - 1 = \frac{\omega_2^2\epsilon^2}{\sigma^2} - \frac{\omega_1^2\epsilon^2}{\sigma^2} \qquad (7b)$$

Dividing both sides of Equation 7b by $$\frac{\omega_1^2}{\omega_2^2} - 1$$

$$\frac{P-1}{\frac{\omega_1^2}{\omega_2^2}-1} = \frac{\frac{\omega_2^2\epsilon^2}{\sigma^2} - \frac{\omega_1^2\epsilon^2}{\sigma^2}}{\frac{\omega_1^2}{\omega_2^2}-1} \qquad (8a)$$

Equation 8 reduces to $$\frac{P-1}{\frac{\omega_1^2}{\omega_2^2}-1} = \frac{(\omega_2^2-\omega_1^2)\frac{\epsilon^2}{\sigma^2}}{\frac{-(\omega_2^2-\omega_1^2)}{\omega_2^2}} \qquad (8b)$$

Therefore, $$\frac{P-1}{\frac{\omega_1^2}{\omega_2^2}-1} = -\frac{\omega_2^2\epsilon^2}{\sigma^2} \qquad (8c)$$

Substituting the value of $$\frac{\omega_2^2 \epsilon^2}{\sigma^2}$$

in Equation 8c for $$\frac{\omega_2^2 \epsilon^2}{\sigma^2}$$

in Equation 4, there is obtained $$V_{R_2} = \frac{I_2 L_T l_R}{2\pi\sigma d^3 \sqrt{1 - \frac{(P-1)\omega_2^2}{\omega_1^2 P - \omega_2^2}}} \quad (9)$$

Accordingly, solving Equation 9 for $\sigma$, the result is $$\sigma = \frac{I_2 L_T l_R}{2\pi d^3 V_{R_2} \sqrt{1 - \frac{(P-1)\omega_2^2}{\omega_1^2 P - \omega_2^2}}} \quad (10)$$

With respect to $\epsilon$, solving Equation 8c for $\epsilon^2$, there is obtained $$\epsilon^2 = -\frac{\sigma^2}{\omega_2^2} \frac{P-1}{\frac{\omega_1^2}{\omega_2^2} P - 1} \quad (11a)$$

Therefore, $$\epsilon = \frac{\sigma}{\omega_2} \sqrt{\frac{1-P}{\frac{\omega_1^2}{\omega_2^2} P - 1}} \quad (11b)$$

Substituting the value of $\sigma$ in Equation 10 for the value of $\sigma$ in Equation 11b, Equation 11b then becomes $$\epsilon = \frac{I_2 L_T l_R}{2\pi d^3 V_{R_2} \omega_2} \frac{\sqrt{\frac{\omega_1^2}{\omega_2^2} P - 1}}{\sqrt{1 - \frac{(P-1)\omega_2^2}{\omega_1^2 P - \omega_2^2}}} \quad (12a)$$

Equation 12a reduces to $$\epsilon = \frac{I_2 L_T l_R}{2\pi d^3 V_{R_2}} \frac{1}{\omega_2} \sqrt{\frac{\omega_2^2(1-P)}{P(\omega_1^2 - \omega_2^2)}} \quad (12b)$$

and by further reduction, Equation 12b becomes $$\epsilon = \frac{I_2 L_T l_R}{2\pi d^3 V_{R_2}} \sqrt{\frac{1-P}{P(\omega_1^2 - \omega_2^2)}} \quad (12c)$$

An examination of Equation 10 for $\sigma$ and Equation 12c for $\epsilon$ will at once indicate that $L_T$, $l_R$, $d$, $\omega_1$ and $\omega_2$ therein are known constants. Accordingly, it will be obvious that if the values for $I_2$, $V_{R_2}$ and $P$ in these equations could be determined, then $\sigma$ and $\epsilon$ would also be known. As will be seen from the description to be presented below of the operation of the apparatus in FIGS. 1 and 2, this is basically what is done, namely, transmitter current $I_2$ and receiver voltage $V_{R_2}$ are given predetermined values which, it will be recognized from Equation 5 for $P$, allows the value of $P$ to be ultimately obtained. Consequently, the desired result of ascertaining the values of $\sigma$ and $\epsilon$ is achieved.

Proceeding now to a consideration of the operation, it should be mentioned that since the amplitude of the voltage received by the receiver varies inversely with frequency, that is, the ampltiude decreases as the frequency increases, as will be noted from Equation 2, the higher of the two frequencies involved, namely, $f_2$, will be treated first in the discussion.

Accordingly, oscillator 10 is made to generate a signal in the audio range having a frequency $f_2$, the signal thusly generated being applied through gain control 11 to power amplifier 12 wherein the signal power is increased for transmission purposes. The signal out of amplifier 12 is then applied to the transmitter antenna which in response thereto radiates electromagnetic waves along the surface of the earth. In the present description, the transmitter antenna is taken as dipole 14.

Since it is desired to maintain the currents in antenna 14 fixed at a predetermined value, gain control 11 is adjusted until the signal out of amplifier 12 is of such a magnitude that current $I_2$ is at this predetermined value. The techniques and devices for measuring the antenna current are well known and readily available and hence need not be discussed here.

At the receiver, the transmitted waves are intercepted by antenna 17 across which a voltage is thereby induced. This voltage is passed by filter 20 since, it will be remembered, the filter has been designed to pass signals in the range of frequencies $f_1$ and $f_2$. At this point it should be mentioned that switch 23 is closed during the period in which a signal at frequency $f_2$ is transmitted. Accordingly, variable attenuator 21 is shorted out of the receiver network, that is, bypassed, and the voltage out of the filter is applied directly to output measuring device 22 whereat the magnitude of the voltage, $V_{R_2}$, is noted.

Having done so, oscillator 10 at the transmitter site is switched to frequency $f_1$ so that electromagnetic waves at frequency $f_1$ are now radiated from antenna 14. Here again, gain control 11 is adjusted so that the transmitter antenna current $I_1$ is at the predetermined value. In other words, gain control 11 is adjusted so that $I_1$ equals $I_2$.

Returning now to the receiver site, switch 23 is opened during this transmission period so that variable attenuator 21 is now in the receiver network. As a result, the voltage induced in antenna 17 is passed through filter 20 to attenuator 21 and, after passing through the attenuator, to output measuring device 22 where its value, $V_{R_1}$, is again noted. Since, for the reason previously given, the voltage produced at the receiver at frequency $f_1$ is greater than the voltage produced at the receiver at frequency $f_2$, that is, since $V_{R_1} > V_{R_2}$, variable attenuator 21 is adjusted until the two voltage readings are identical, that is, until $V_{R_1} = V_{R_2}$. It will be obvious to those skilled in the art that the scale of the variable attenuator can be calibrated to provide a direct reading of $P$ and when this is done information is provided that immediately determines the value of the earth's conductivity, $\sigma$, either by substitution in Equation 10 or by referring to a plotted curve of $P$ versus $\sigma$. In the same manner, the value of the earth's dielectric constant, $\epsilon$, is also determined, namely, by substitution in Equation 12c or by reference to a curve of $P$ versus $\epsilon$.

It will be remembered that the values of $\sigma$ and $\epsilon$ thusly obtained are valid only for the intervening path, that is to say, for the earth between the transmitter and receiver sites. However, the values of conductivity and dielectric constant may be obtained throughout an entire area by successively repositioning the receiver antenna and its associated equipment to different points along the circumference of a circle having the distance "$d$" as a radius, the steps delineated above being followed at each such position. It is thus seen that the propagational characteristics of an entire area, whether it be large or small, may be expeditiously obtained with facility.

It should also be mentioned once again at this time that frequencies $f_1$ and $f_2$ are respectively selected slightly below and slightly above the frequency of interest, which is the frequency at which the communication system is to be designed, namely, $f_0$. The departure of frequencies $f_1$ and $f_2$ from frequency $f_0$ is dependent, to a large extent, on the value of $f_0$ which may, by way of example, be any frequency up to 40 kilocycles or so. It will be recognized by those skilled in the art that for sake of accuracy the percentage deviation, that is, $$\frac{f_0 - f_1}{f_0} \text{ or } \frac{f_2 - f_0}{f_0}$$

should be smaller at the higher frequency values of $f_0$ than at the smaller values.

It should further be mentioned that Equation 1, which is the basic equation, can be very greatly simplified when the value of the dielectric constant is known to be very much less than the value of conductivity, that is, when $\epsilon$ is very much less than $\sigma$. In such a case, Equation 1, to a very close approximation, reduces to:

$$|E_\phi|_{max.} = \frac{IL_T}{2\pi\sigma d^3}$$

Under such conditions, only a single frequency need be used to obtain conductivity, rather than the two frequencies heretofore mentioned, and when the conductivity is thusly obtained its value can be substituted in Equation 1 in order to obtain the value of the dielectric constant.

Finally, it should be mentioned that loop antennas may be used herein instead of horizontal dipoles shorted to the ground at their ends. Hence, a loop antenna positioned horizontal to the earth and a loop antenna positioned vertical to the earth may respectively be used at the transmitter and receiver sites with equally good effect.

Having thus described the invention, what is claimed as new is:

Apparatus for determining the conductivity and the dielectric constant of the earth, at a predetermined frequency, between two points on the surface thereof, said apparatus comprising: transmitter equipment including a first dipole antenna positioned substantially parallel to the earth at one of the two points and grounded to the earth at the ends thereof, an oscillator adapted to generate in succession a first signal at a frequency slightly above the predetermined frequency and a second signal at a frequency slightly below the predetermined frequency, a power amplifier receptive of the signals generated by said oscillator and coupled to said first antenna for producing currents therein at each of the two frequencies; a gain control unit coupled between said oscillator and said amplifier, said gain control unit being adapted to adjust the amplitude of the signals received by said amplifier to produce equal currents in said first antenna, electromagnetic waves at each frequency being radiated from said first antenna; and receiver equipment spaced apart from said transmitter equipment, said receiver equipment including a second dipole antenna positioned substantially parallel to the earth at the other of the two points and grounded to the earth at the ends thereof, said second antenna intercepting the successive electromagnetic waves to produce voltages at each of said two frequencies; a voltage measuring device; and attenuator means coupled between said second antenna and said measuring device and adapted to attenuate the greater of said induced voltages so that equal voltages are measured by said device, said attenuator means including additional means for indicating the ratio of said induced voltages when said greater induced voltage is attenuated, said ratio corresponding to the conductivity of the earth between the two points at the predetermined frequency.

References Cited in the file of this patent

UNITED STATES PATENTS

| | | |
|---|---|---|
| 2,268,106 | Blau | Dec. 30, 1941 |
| 2,642,477 | Puranen et al. | June 16, 1953 |
| 2,731,596 | Wait et al. | Jan. 17, 1956 |
| 2,766,421 | Wait et al. | Oct. 9, 1956 |
| 2,931,973 | Puranen | Apr. 5, 1960 |
| 2,992,325 | Lehan | July 11, 1961 |
| 2,994,031 | Slattery | July 25, 1961 |

FOREIGN PATENTS

| | | |
|---|---|---|
| 431,731 | Great Britain | July 15, 1935 |